J. F. WHITE & B. C. KOUGH.
RESILIENT VEHICLE WHEEL.
APPLICATION FILED JULY 13, 1914.
1,202,939.
Patented Oct. 31, 1916.
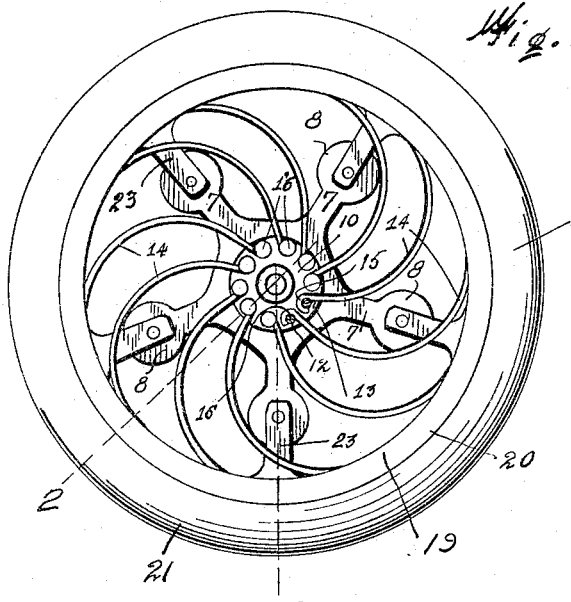
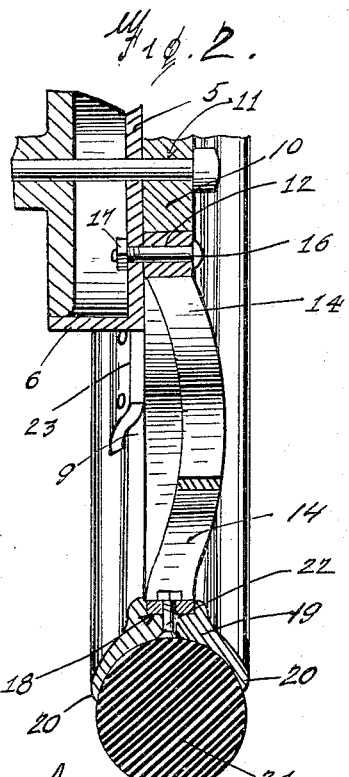
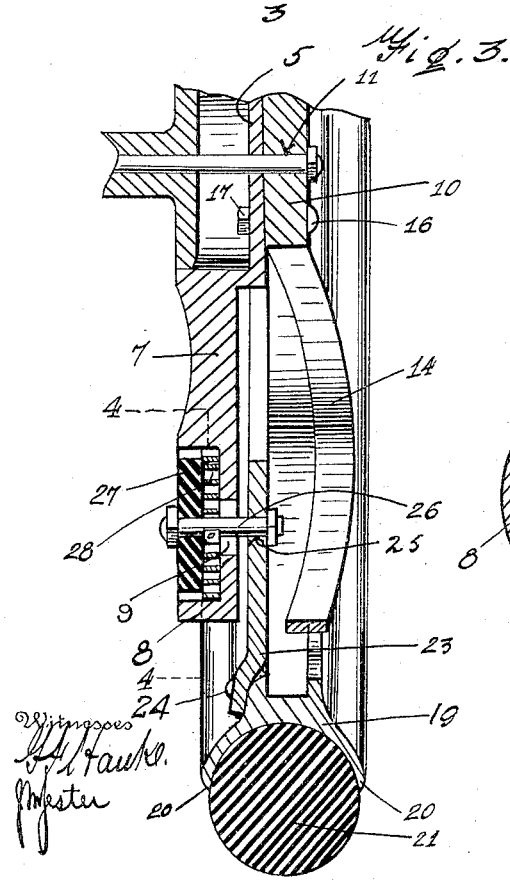
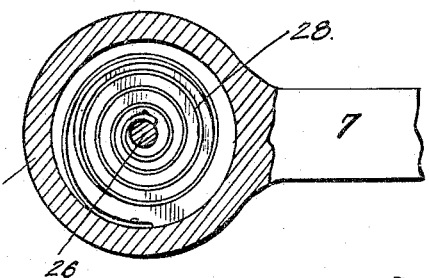
Inventors
J. F. White.
B. C. Kough.

UNITED STATES PATENT OFFICE.

JOHN F. WHITE AND BLAIR C. KOUGH, OF SUNNYSIDE, KANSAS.

RESILIENT VEHICLE-WHEEL.

1,202,939.   Specification of Letters Patent.   Patented Oct. 31, 1916.

Application filed July 13, 1914. Serial No. 850,708.

*To all whom it may concern:*

Be it known that we, JOHN F. WHITE and BLAIR C. KOUGH, citizens of the United States, residing at Sunnyside, in the county of Wichita, State of Kansas, have invented certain new and useful Improvements in Resilient Vehicle-Wheels; and we do hereby declare the following to be a full, clear, and exact description of the invention, such as will enable others skilled in the art to which it appertains to make and use the same.

This invention relates to vehicle wheels, particularly to wheels for motor vehicles, and has for it object the provision of a simple and novel resilient wheel whereby the use of pneumatic tires is obviated, and so constructed as to absorb the shocks and jars incident to travel over roads.

An important object is the provision of a resilient wheel provided with shock absorbing member auxiliary to the spring spokes whereby undue strain upon the spokes is prevented in case of heavy shocks, whereby the spokes will be prevented from breaking and whereby a proper cushioning effect will be produced.

Other objects and advantages such as simplicity, cheapness in manufacture, efficiency and durability in use and the general improvement of the art will be carefully brought out in the following specification and illustrated in the accompanying drawing, in which—

Figure 1 is a side elevation of our novel wheel. Fig. 2 is a cross sectional view therethrough on the line 2—2 of Fig. 1. Fig. 3 is a sectional view on the line 3—3 of Fig. 1, and Fig. 4 is a detail view of a shock absorbing member and its associated parts.

Referring more particularly to the drawing, the numeral 5 designates the hub of the wheel which is formed as a flanged shell 6. Formed on the shell 6 and radiating over the periphery thereof are arms 7 which carry upon their outer ends cups or socket members 8 which are provided with openings 9 for a purpose to be described.

The spring spoke holding hub comprises a ring 10 disposed upon the face of the shell 6 and provided with a central opening 11 for the passage of the axle. The ring 10 is provided with a plurality of holes 12 with which communicate slots 13 extending to the periphery of the ring. A plurality of spring spokes 14 are associated with the ring 10 and are secured thereon by having their ends bent to form eyes 15 disposed within the holes 12 with the adjacent portions of the spokes disposed in the slots 13. Bolts 16 pass through the eyes 15 and through the face portion of the shell 6 and are secured in place by nuts 17. At their outer ends, the spring spokes 14 are secured within recesses 18 formed in a felly or rim 19 which is provided with the usual flanges 20 for securely holding a preferably solid rubber tire 21. The ends of the spokes are secured within the recesses 18 by bolts 22 or the like.

The provision of a hub having spring spokes connected therewith and carrying a rim is well known to the art. It has been found, however that a wheel constructed in this manner lacks the proper strength to withstand heavy shocks and jars occasioned by the passage of the wheel over stones, ruts and other obstructions. It is with this objection in view that we have provided specially designed shock absorbing members auxiliary to the spring spokes, whereby the springs are relieved of undue strain and are prevented from breaking and also whereby additional cushioning against shocks is secured.

In order to accomplish the absorption of the shocks, we provide a plurality of arms 23 secured as at 24, upon the rim 19 and alining with the arms 7. The inner ends of the arms 23 are provided with openings 25 concentric with the openings 9 in the socket members 8. Each of the arms 23 is provided with a stub shaft 26 passing through the opening 25 and carrying upon its other end a roller 27 formed preferably of rubber. Under normal conditions the periphery of the rollers 27 is spaced from the inner periphery of the socket member 8. When the wheel strikes an obstruction and is subjected to the consequent heavy strain, the arms 7 and 23 moves relatively to each other and the rollers 27 at the bottom of the wheel will be forced into contact with the periphery of the socket members 8 at their upper portion. It will be seen therefore that the spring spokes 14 will operate to a certain extent and that when an extraordinarily hard shock is received the jar will be taken up by the engagement of the rollers with the walls of the sockets. In order to provide additional resilience and to cushion the action of the rollers within the sockets we provide spiral springs 28 disposed within the socket members 8, having their outer ends connected with the socket members and their inner ends connected with the stub shaft 26.

From the foregoing description and a study of the drawing it will be apparent that we have thus provided a simple spring wheel structure wherein ordinary shocks will be absorbed by the spring spokes, and wherein more violent shocks will be absorbed by the rubber rollers and spiral springs disposed within the socket members, whereby undue strain upon the spring spokes is prevented and whereby easier riding of the vehicle carrying these wheels will be obtained.

It will be readily understood that we reserve the right to make various changes in the form, construction and arrangement of parts without departing from the spirit of the invention or limiting the scope of the subjoined claim.

Having thus described our invention, we claim:

A resilient wheel comprising a hub, a plurality of arms radiating therefrom, socket members formed on the outer ends of said arms, a rim, a plurality of arms secured to said rim and extending inwardly in line with respective first named arms, shafts secured to the inner end of the second arms and extending through elongated openings in the socket members, rubber rollers on said shafts having their peripheries spaced from the corresponding wall of the related socket member, and a spiral spring within the socket member between the rubber roller and the inner wall of the socket member, said spiral spring having one end secured to the socket member and its other end to the related shaft.

In testimony whereof we affix our signatures, in the presence of two witnesses.

JOHN F. WHITE.
BLAIR C. KOUGH.

Witnesses:
JOHN H. SCOTT,
R. S. GARNES.

Copies of this patent may be obtained for five cents each, by addressing the "Commissioner of Patents, Washington, D. C."